US010553120B2

(12) United States Patent
Schmutz et al.

(10) Patent No.: US 10,553,120 B2
(45) Date of Patent: Feb. 4, 2020

(54) FAIL SAFE AIRCRAFT MONITORING AND TRACKING

(71) Applicant: L3 TECHNOLOGIES, INC., New York, NY (US)

(72) Inventors: Thomas R. Schmutz, Sarasota, FL (US); Eduardo M. Carro, Sarasota, FL (US); Ayaz Nemat, Sarasota, FL (US); Sean P. Reilly, Bradenton, FL (US)

(73) Assignee: L3 TECHNOLOGIES, INC., New York, NY (US)

( * ) Notice: Subject to any disclaimer, the term of this patent is extended or adjusted under 35 U.S.C. 154(b) by 190 days.

(21) Appl. No.: 14/486,350

(22) Filed: Sep. 15, 2014

(65) Prior Publication Data
US 2016/0075443 A1 Mar. 17, 2016

(51) Int. Cl.
*B64D 45/00* (2006.01)
*G08G 5/00* (2006.01)
*G01C 21/14* (2006.01)

(52) U.S. Cl.
CPC ... *G08G 5/0013* (2013.01); *B64D 2045/0065* (2013.01)

(58) Field of Classification Search
CPC ...... G07C 5/008; G07C 5/085; G08G 5/0021; B64D 45/00; B64D 2045/0065; H04B 7/18506
See application file for complete search history.

(56) References Cited

U.S. PATENT DOCUMENTS

| 4,729,102 | A | * | 3/1988 | Miller, Jr. | .............. G07C 5/085 360/5 |
| 6,009,356 | A | | 12/1999 | Monroe | |
| 6,092,008 | A | * | 7/2000 | Bateman | ................ G07C 5/008 244/1 R |
| 6,470,258 | B1 | | 10/2002 | Leamy et al. | |

(Continued)

FOREIGN PATENT DOCUMENTS

| CN | 1533948 A | 10/2004 |
| CN | 1618088 A | 5/2005 |

(Continued)

OTHER PUBLICATIONS

International Search Report and Written Opinion dated Nov. 25, 2015 for International (PCT) Patent Application No. PCT/US2015/049984.

(Continued)

*Primary Examiner* — Thomas G Black
*Assistant Examiner* — Ce Li Li
(74) *Attorney, Agent, or Firm* — Dickinson Wright PLLC

(57) ABSTRACT

Flight data recorder receives from an aircraft a data stream specifying values for flight data parameters while an aircraft is in flight. The flight data recorder stores the values in a crash survivable non-volatile memory unit of the flight data recorder. The flight data recorder determines an occurrence during flight of an exception condition based on an evaluation of at least one exception parameter. Responsive to determining the occurrence of the exception condition, the flight data recorder wirelessly communicates selected aircraft data to a remote location external of the aircraft using a wireless transmitter under the exclusive control of the flight data recorder.

19 Claims, 5 Drawing Sheets

(56) References Cited

U.S. PATENT DOCUMENTS

| | | | |
|---|---|---|---|
| 8,706,357 B1* | 4/2014 | van den Heuvel | B64D 45/00 701/14 |
| 2002/0035416 A1* | 3/2002 | De Leon | G07C 5/008 701/14 |
| 2003/0052798 A1* | 3/2003 | Hanson | B60R 25/102 340/945 |
| 2003/0062447 A1* | 4/2003 | Cordina | B64D 45/0015 244/118.5 |
| 2003/0135311 A1 | 7/2003 | Levine | |
| 2003/0152145 A1* | 8/2003 | Kawakita | H04N 5/77 375/240.12 |
| 2003/0193409 A1 | 10/2003 | Crank | |
| 2004/0027255 A1* | 2/2004 | Greenbaum | G07C 5/008 340/945 |
| 2004/0128039 A1 | 7/2004 | Podowski | |
| 2006/0157619 A1* | 7/2006 | Cordina | B64D 45/0015 244/118.5 |
| 2007/0130599 A1* | 6/2007 | Monroe | G08B 13/19641 725/105 |
| 2009/0319102 A1* | 12/2009 | Winterhalter | G07C 5/085 701/14 |
| 2012/0191273 A1 | 7/2012 | Jacobs | |
| 2013/0158751 A1* | 6/2013 | Cornell | G07C 5/008 701/14 |
| 2013/0190999 A1 | 7/2013 | Rado | |
| 2013/0204469 A1 | 8/2013 | Horsager et al. | |
| 2014/0277924 A1* | 9/2014 | van den Heuvel | B64D 45/00 701/33.4 |
| 2016/0171790 A1* | 6/2016 | Abraham | B63G 8/41 342/53 |

FOREIGN PATENT DOCUMENTS

| | | | |
|---|---|---|---|
| CN | 102224076 A | 10/2011 | |
| FR | 2963859 A1 * | 2/2012 | G07C 5/008 |

OTHER PUBLICATIONS

Notice on the First Office Action dated Dec. 24, 2018 by the Intellectual Property Office of the People's Republic of China on related Chinese patent application 201580060601.4.

Communication pursuant to Rule 164(1) EPC dated Dec. 12, 2018 by the European Patent Office on related European patent application 15842938.1.

* cited by examiner

FAIL SAFE AIRCRAFT MONITORING AND TRACKING

BACKGROUND OF THE INVENTION

Statement of the Technical Field

The inventive arrangements relate to electronic devices, and more particularly to systems and methods for monitoring aircraft.

Description of the Related Art

Commercial and civil aviation aircraft are closely monitored and tracked by authorities and industry participants for reasons of safety, air traffic control and maintenance purposes. A variety of different techniques and methods have been developed and are currently in use to perform such monitoring. Conventional practice is to use two separate radar systems for purposes of air traffic control. These include a primary radar system and a secondary radar system. Primary radar systems detect pulses of electromagnetic energy which are reflected off of remote aircraft to determine the approximate position of such aircraft. Because such systems operate by using the aircraft body as a passive reflector of electro-magnetic energy, they do not require cooperation or active participation of the aircraft being tracked.

Secondary radar systems require the presence of a transponder onboard the aircraft to automatically transmit a unique coded signal which identifies the aircraft on which the transponder is located. The transponder is arranged to transmit such information automatically in response to detecting an interrogation signal broadcast from a ground station. The transponder can broadcast additional information concerning the aircraft, such as its altitude. Aircraft heading and speed data can be derived from successive transmissions received from the same transponder at different times and azimuth angles relative to a ground station. Notably, once an aircraft is more than about 150 miles from the nearest primary and/or secondary radar station, the ability to track the aircraft using these methods is greatly diminished or non-existent. From the perspective of an air traffic controller, secondary radar systems are particularly important. Primary radar can identify the presence and position of aircraft, but without the secondary radar information, identification and tracking of particular aircraft can be very difficult in a crowded air space.

Aircraft commonly have GPS systems onboard which allow flight crews to determine the current location of their aircraft. However, this GPS information is not commonly broadcast by the aircraft and is not generally available to ground stations or air traffic controllers using current systems. One service which facilitates aircraft monitoring is the Aircraft Communications Addressing and Reporting System (ACARS). The ACARS service allows computers on-board an aircraft to communicate through satellite relay with ground stations concerning the conditions of aircraft systems. The ACARS system is commonly used to facilitate maintenance of aircraft when they arrive at their destination. Recent developments for tracking aircraft include a new system referred to as Automatic Dependent Surveillance Broadcast (ADS-B). This system is expected to rely upon GPS for aircraft position data, which information will then be relayed to ground stations on a regular basis for use by air traffic controllers. At least one operator of low earth orbiting (LEO) satellites has proposed placing ADS-B receivers on such satellites with the goal of facilitating global, real-time aircraft surveillance But these systems are relatively expensive for aircraft operators to use due to the substantial amount of data which must be communicated through the satellite-based communication system.

Still, most systems onboard an aircraft can be selectively disabled by the flight crew. These systems can be disabled by means of cockpit controls and/or by circuit breakers which control the primary electrical power to such systems. As such, most aircraft systems can be disabled if the flight crew chooses to do so. A sufficiently knowledgeable flight crew therefor can have the ability to disable all or most of the systems which are normally used to track aircraft, including GPS based tracking systems such as ADS-B.

SUMMARY OF THE INVENTION

Embodiments of the invention concern a method for using a flight data recorder for aircraft monitoring and tracking under exceptional conditions. A flight data recorder receives from an aircraft a data stream specifying values for a plurality of flight data parameters while an aircraft is in flight. The flight data recorder stores one or more of the values in a crash survivable non-volatile memory unit of the flight data recorder. The flight data recorder determines an occurrence during flight of an exception condition based on an evaluation of at least one exception parameter. Responsive to determining the occurrence of the exception condition, the flight data recorder wirelessly communicates selected aircraft data to a remote location external of the aircraft using a wireless transmitter under the exclusive control of the flight data recorder. The selected aircraft data transmitted from the flight data recorder can include any data that is useful for tracking and/or monitoring an aircraft by flight controllers. For example, the selected aircraft data can include a geographic location, speed and heading of the aircraft on which the flight data recorder is disposed.

The one or more exception parameters can be chosen to include one or more of the flight data parameters which are contained in the data stream. Exception parameters can also include data values provided from certain embedded components associated with the flight data recorder. For example, such data values can be provided from a GPS unit and/or a wireless receiver/transmitter which are attached to or embedded in the flight data recorder. The exception parameters can specify any type of flight data that is useful for determining an occurrence of an exceptional condition during flight. For example, an exception parameter can be a parameter that is useful for determining one or more of a position, a heading, and a deviation from a pre-determined flight plan for an aircraft in which the flight data recorder is disposed. The one or more exception parameters can also include an output (a coded message) of the wireless receiver which is used to facilitate remote activation of wireless transmissions from the flight data recorder as described herein. An occurrence of the exception condition can based on an analysis of at least one exception parameter. Such an analysis can involve a simple comparison of an exception parameter value to at least one predetermined value which is stored in a memory of the flight data recorder, or can involve application of a more complex analysis.

Since a flight data recorder is required to be connected to an essential electrical bus of an aircraft, it cannot be practically disabled by a flight crew during flight. In order to prevent the flight crew from disabling transmissions of selected aircraft data as described herein, primary power for the wireless receiver, wireless transmitter and GPS units is advantageously provided through the same essential electrical bus as the flight data recorder, or through an electrical coupling provided by the flight data recorder.

According to another aspect, the invention concerns a flight data recorder system which facilitates aircraft monitoring and tracking under exceptional conditions. The flight data recorder system includes a system interface which is arranged to receive a data stream from an aircraft specifying a plurality of flight data parameters while the aircraft is in flight. The flight data recorder can also include a crash survivable non-volatile memory unit in which one or more of the flight data parameters are stored after being received at the system interface. The flight data recorder system further includes a wireless transmitter under the exclusive control of the flight data recorder. The wireless transmitter is configured to communicate with a remote receiving device external of the aircraft during flight. A processing system in the flight data recorder determines an occurrence of an exception condition based on an evaluation of at least one exception parameter. In response to determining the occurrence of the exception condition the processing system causes the wireless transmitter to wirelessly communicate selected aircraft data to the remote receiving device.

The invention also includes an aircraft with a failsafe tracking capability. The aircraft includes a flight data recorder system as described above. The flight data recorder system is electrically coupled to an essential electrical bus of the aircraft which cannot practically be disabled by a flight crew during flight operations without disabling other essential equipment onboard the aircraft which is/are required for flight operations. Accordingly, the flight crew is prevented from disabling the communication of the selected aircraft data to the remote receiving device in the event of an exceptional condition.

The invention also includes an enhanced monitoring and reporting (EMR) system which facilitates aircraft monitoring and tracking under exceptional conditions. The EMR system includes a system interface which is arranged to receive a data stream from a flight data acquisition unit of an aircraft specifying flight data parameters while the aircraft is in flight. A memory unit is provided in the EMR in which one or more of the flight data parameters are stored after being received at the system interface. A wireless transmitter is also provided. The wireless transmitter is under the exclusive control of the EMR system and is configured to communicate with a remote receiving device external of the aircraft during flight. In operation, a processing system of the EMR determines an occurrence of an exception condition based on an evaluation of at least one exception parameter. Then, in response to determining the occurrence of the exception condition, the processing system causes the wireless transmitter to wirelessly communicate selected aircraft data to the remote receiving device. Notably, one or more of the processing system, the wireless transmitter and the memory unit are disposed internal of a housing which defines an avionics equipment tray that is configured to accept a flight data recorder.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
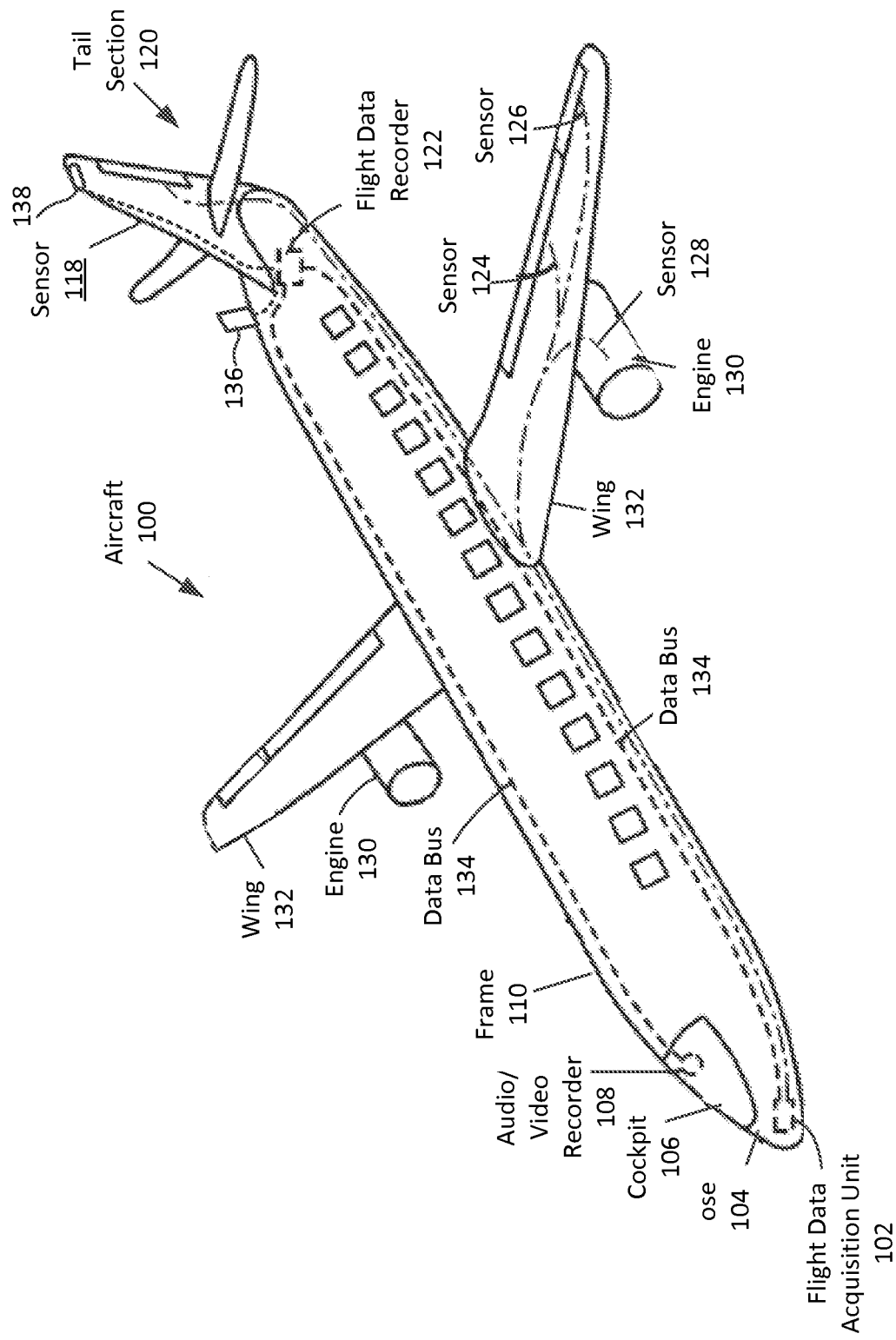
FIG. 1 is a perspective view of an exemplary aircraft with a flight data recorder that is useful for understanding the present invention.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Modern aircraft include a variety of different systems that facilitate monitoring and tracking of such aircraft. These can include transponders for secondary radar, equipment which supports Aircraft Communications Addressing and Reporting System (ACARS) services, equipment to support automatic dependent surveillance-broadcast (ADS-B). Although these systems can work well, experience has shown that they can be disabled by a determined flight crew under certain conditions. For example, if the flight crew intentionally wishes to avoid monitoring and tracking of their aircraft by air traffic controllers, the flight crew has the ability to shut down these systems. Thereafter, the flight crew can direct the aircraft on a different course without reporting any deviation to its flight plan. The inventive arrangements provide a practical means to ensure that an aircraft in such a scenario can still be tracked in real time so that its new course and final destination can be determined by authorities.

Most commercial and military aircraft, as well as many civilian aircraft, carry Flight Data Recorders (FDRs) and/or Cockpit Voice Recorders (CVRs). During normal flight operations, the FDR records specific aircraft performance parameters, such as air speed, altitude, vertical acceleration, time, magnetic heading, control-column position, rudder-pedal position, control-wheel position, horizontal stabilizer and fuel flow. The CVR records cockpit voices and other audio such as conversations between ground control and flight crew. Each of the recorders has an enclosure containing an electronic interface, processing circuits and a Crash Survivable Memory Unit (CSMU). The CSMU contains non-volatile memory for storing the flight data and voice data. A CVR can have a Recorder Independent Power Supply (RIPS) which provides a backup power source in the event that standard aircraft power is interrupted or lost. In some applications, an FDR and a CVR can be combined into a single device (i.e. a Cockpit Voice and Data Recorder or (CVDR)) which performs both functions. For convenience, the invention will be described herein with respect to an FDR, but it should be understood that the invention also applies to a CVDR. Accordingly, all references to an FDR should be understood to include a CVDR.

FDRs are difficult to shut down in an aircraft—especially while the aircraft is in flight. In accordance with 14 CFR 25.1459 an FDR must receive its electrical power from the bus that provides the maximum reliability for operation of the flight data recorder without jeopardizing service to essential or emergency loads. This usually means that the FDR equipment is powered by one of the essential electrical busses in the aircraft. An electrical bus in an aircraft is generally understood to be a common conductor wire, often of high capacity, to which several devices requiring electrical power are connected. As used herein, an essential electrical bus can be understood to mean an electrical bus which cannot be shut down under flight conditions without disabling other equipment that is normally understood to be essential for safe flight operations. The circuit breakers for such busses are usually located in areas of the aircraft that are difficult or impossible to access by flight crew members while the aircraft is in flight. By embedding various communications devices into the FDR, and by enabling wireless streaming of data off the aircraft under certain conditions, the FDR could autonomously prevent a situation wherein the aircraft is made difficult to track (or lost) by flight controllers due to tampering with onboard tracking equipment.

The data streaming from an FDR as described herein can be provided on a regular basis during normal flight conditions. However, it will be appreciate that such data streaming is unnecessary under most conditions since the aircraft is usually capable of being tracked with conventional equipment (e.g. a transponder, ADS-B). Accordingly, the FDR can be configured to selectively determine when such data stream should be communicated. For example, the FDR can detect the occurrence of certain exceptional conditions which will then trigger the FDR and embedded communication equipment to begin autonomously data streaming concerning certain aircraft data. The data stream will be communicated to a remote location using a wireless communication link.

In order to prevent the flight crew from disabling the wireless communication equipment used by the FDR as described herein, such equipment can be exclusively under the control of the FDR. Moreover, such communication equipment is advantageously embedded, attached or otherwise integrated with the FDR so that it is generally difficult to access by flight crew and others during flight. An FDR is usually located in the tail of the aircraft and is difficult to shut down since it is must be powered from an essential electrical bus. Accordingly, the communication equipment can be protected from tampering during flight by ensuring that the communication equipment is also powered from such essential electrical bus. This can be accomplished by separately directly providing power to the communication equipment from the same essential electrical bus as is used for the FDR. Alternatively, primary electrical power to the communication equipment can be provided from the FDR. For example, the communication equipment could be powered by a common power supply used to power the FDR. In such case, the dedicated communication equipment cannot be shut down without powering down the FDR.

The communication equipment for the FDR can be any suitable equipment capable of carrying out the data communication tasks described herein. According to one aspect, the communication equipment can include a transmitter which is configured for satellite radio communications. The communication equipment can be designed to use any suitable satellite communication protocol, including short burst communications. Alternatively (or in addition to such satellite communication means), it is advantageous for the communication equipment to conform to known communication protocols defined for ADS-B transmissions. An ADS-B-Out transponder channel could transmit ADS-B type information to ground controllers and other aircraft in the vicinity using communication protocols defined for ADS-B. As a further alternative or addition to the foregoing, the communication equipment can be comprised of cellular radio equipment, WiFi (based on IEEE 802.11 standard) or WiMax (based on IEEE 802.16 standard) type communication equipment. Such communications protocols could be used when the aircraft is near the ground and/or in range of appropriate commercial networks while airborne.

The FDR can also include a GPS receiver to provide accurate location information concerning the aircraft at all times. The location information from the GPS can therefore be accessible to the FDR regardless of whether the flight crew has shut down other GPS receivers and navigation equipment normally used by the crew to pilot the aircraft. The FDR can then include the location information received from the dedicated GPS receiver in the data stream which is broadcast from the aircraft under the exceptional conditions described herein. In order to prevent the flight crew from disabling the dedicated GPS receiver, it is advantageously embedded, attached or otherwise integrated with the FDR. The GPS receiver is under the control of the FDR and a primary source of power for the GPS can be supplied directly from an essential electrical bus of the aircraft, or from the FDR itself.

In order to determine the occurrence of an exception condition, one or more parameters can be extracted from a conventional data stream which is communicated to an FDR. These parameters can be evaluated to determine if an exceptional condition exists that would warrant activating the FDR communication equipment as described herein. For example such parameters can include air speed, altitude, vertical acceleration, time, magnetic heading, control-column position, rudder-pedal position, control-wheel position, horizontal stabilizer and fuel flow. Other parameters which may be considered include aircraft location information. The aircraft location information can be included in the data stream received by the FDR from the aircraft. However, these and other data streams can potentially be disabled by a determined flight crew. Accordingly, the aircraft location can instead be determined by accessing a separate stream of data from a GPS receiver that is embedded in or dedicated for use by the FDR.

A further parameter which can be evaluated for determining the existence of an exceptional condition can be comprised of an output from a wireless receiver. The wireless receiver can be designed to receive a remote trigger signal which is used to notify the FDR that an exceptional condition exists. For example, if authorities on the ground become aware of efforts by flight crew to disable aircraft tracking equipment, then they can transmit a signal to the wireless receiver which will specify the existence of an exceptional condition. The signal can also be generated by an authorized person on-board an aircraft, exclusive of the flight crew. For example, an air marshal on-board the aircraft can be provided with a battery powered transmitter capable of transmitting a signal as described herein. After such signal is received at the wireless receiver, it will be evaluated by the FDR to determine if it satisfies some predetermined criteria. For example, the FDR can determine whether the received signal contains coded data which signifies that transmission of selected aircraft data shall begin. Like the GPS and wireless transmitter described herein, the wireless receiver can be embedded or dedicated to FDR. Accordingly, the wireless receiver is preferably under the exclusive control of the FDR. A primary source of power for the wireless receiver is supplied directly from an essential electrical bus of the aircraft, or from the FDR itself.

The specific exception conditions that will trigger the FDR to begin wireless transmissions as described herein can vary depending upon the particular implementation. Examples of exception conditions include: deviation from a predetermined flight plan; departure from a predetermined geographic area; specific conditions relating to air speed, altitude, vertical acceleration, time, magnetic heading, control-column position, rudder-pedal position, control-wheel position, horizontal stabilizer and fuel flow. In some embodiments, a cockpit voice recorder can be integrated into an FDR to form a CVDR. In such embodiments, certain sounds detected from the cockpit can define exception events. For example, a sound of a certain aircraft alarm, explosion or gunshot could define an exceptional event. Voice recognition software can be used to identify certain words which could also indicate the occurrence of an exception event.

From the foregoing, it will be understood that the parameters evaluated by the FDR for purposes of identifying an exceptional condition can be provided from the data stream normally communicated to the FDR, from the GPS unit, and/or from the wireless receiver. The evaluation of these parameters can be as simple as a comparison of measured/detected values with predetermined values which are stored in the flight data recorder. However, the evaluation process can also be more complex. For example, a plurality of these parameters can be used in combination to determine a trigger event. Also, two or more of these parameters can be used to determine a third value which is then evaluated to determine whether an exceptional event has occurred. Accordingly, the FDR can be configured to process one or more of the parameters it receives and apply various algorithms to determine the occurrence of an exceptional event. For example, the FDR can use the received parameters to determine whether an aircraft has deviated from a flight plan, this can be determined using GPS data (e.g. from a dedicated GPS unit) and/or from extrapolated flight data based on other parameters that are provided to the FDR. When an exceptional condition is detected, the FDR can begin streaming data to a ground station directly or indirectly (e.g. using a satellite link) using the embedded communication equipment. The FDR is uniquely qualified to perform these functions because a substantial amount of flight data is already routed to the unit, and because it is difficult to disable the FDR while the aircraft is in flight.

The selected aircraft data transmitted from the flight data recorder in response to a condition as described herein can include any data that is useful for tracking and/or monitoring an aircraft by flight controllers. For example, the selected aircraft data can include a geographic location, speed and heading of the aircraft on which the flight data recorder is disposed. But since the flight data to the FDR is being directly accessed, the selected aircraft data can advantageously include any other data that is available in a data stream that is conventionally communicated to a flight data recorder. Thus, the selected data transmitted with the inventive arrangements described herein can further include information such as air speed, altitude, vertical acceleration, time, magnetic heading, control-column position, rudder-pedal position, control-wheel position, wing flap position, horizontal stabilizer, fuel flow and landing gear position. Of course the invention is not limited to the foregoing and any other information normally communicated to the FDR can also be included.

Exemplary System Implementing the Present Invention

Referring now to FIG. 1, there is provided a perspective view of a commercial aircraft 100 that implements the present invention. The aircraft 100 is generally a vehicle that is able to fly by being supported by air. The aircraft 100 counters the force of gravity by using the thrust from engines. In the exemplary embodiment shown, the aircraft 100 comprises a nose section 104, a cockpit 106, a fuselage or airframe 110, a tail section 120, wings 132 and engines 130. However, the inventive arrangements are not intended to be limited to fixed wing aircraft. Instead, the inventive arrangements described herein can be utilized in any other type of aircraft as well, including rotor craft.

A Flight Data Acquisition Unit (FDAU) 102 is positioned in the nose section 104 of the aircraft 100 to acquire flight information from corresponding sensors located throughout the aircraft 100. Such flight information can include, but is not limited to, air speed, altitude, vertical acceleration, time, magnetic heading, control-column position, rudder-pedal position, control-wheel position, wing flap position, horizontal stabilizer, fuel flow and landing gear position. FDAUs 102 are well known in the art, and therefore will not be described in detail herein.

Sensors are placed on critical surfaces and system components of the aircraft 100 to convert real-time physical flight measurements into electrical signals for the FDAU 102. Typical aircraft sensors include an engine speed sensor 128, a wing flap position sensor 124, an aileron position sensor 126 and a rudder position sensor 118. The aircraft sensors 118 and 124-128 can be connected to the FDAU 102 through a fly-by-wire data bus 134 or wireless channel. The aircraft sensors 118 and 124-128 are well known in the art, and therefore will not be described in detail herein.

An Audio/Video Recorder (AVR) 108 is provided in the aircraft 100 to collect other flight related information, such as audio and video data. The AVR 108 can be located in the cockpit, passenger area, cargo hold or landing gear compartment of the aircraft 100. AVRs 108 are well known in the art, and therefore will not be described in detail herein.

The FDAU 102 and AVR 108 route flight related information to a Flight Data Recorder (FDR) 122 via the data bus 134, direct link or wireless transmission. FDR 122 is mounted to the airframe 110, typically in the tail section of the aircraft to maximize survivability. FDR 122 can be implemented exclusively as a flight data recorder, but can also comprise a Cockpit Voice Recorder (CVR), a Cockpit Voice and Flight Data Recorder (CVFDR) or other combination flight data and audio/video recorder. FDR 122 is applicable to fixed wing and rotor aircraft, including commercial jets, military aircraft, drones, ultra-light aircraft, blimps, balloons and flying wings. The FDR 122 can also be adapted to marine transportation systems such as boats, submarines, hovercraft, also spanning to pleasure/recreational, scientific, commercial, land-based vehicles and space travel. Further details of the FDR 122 are shown in FIG. 2.

Figure 2:
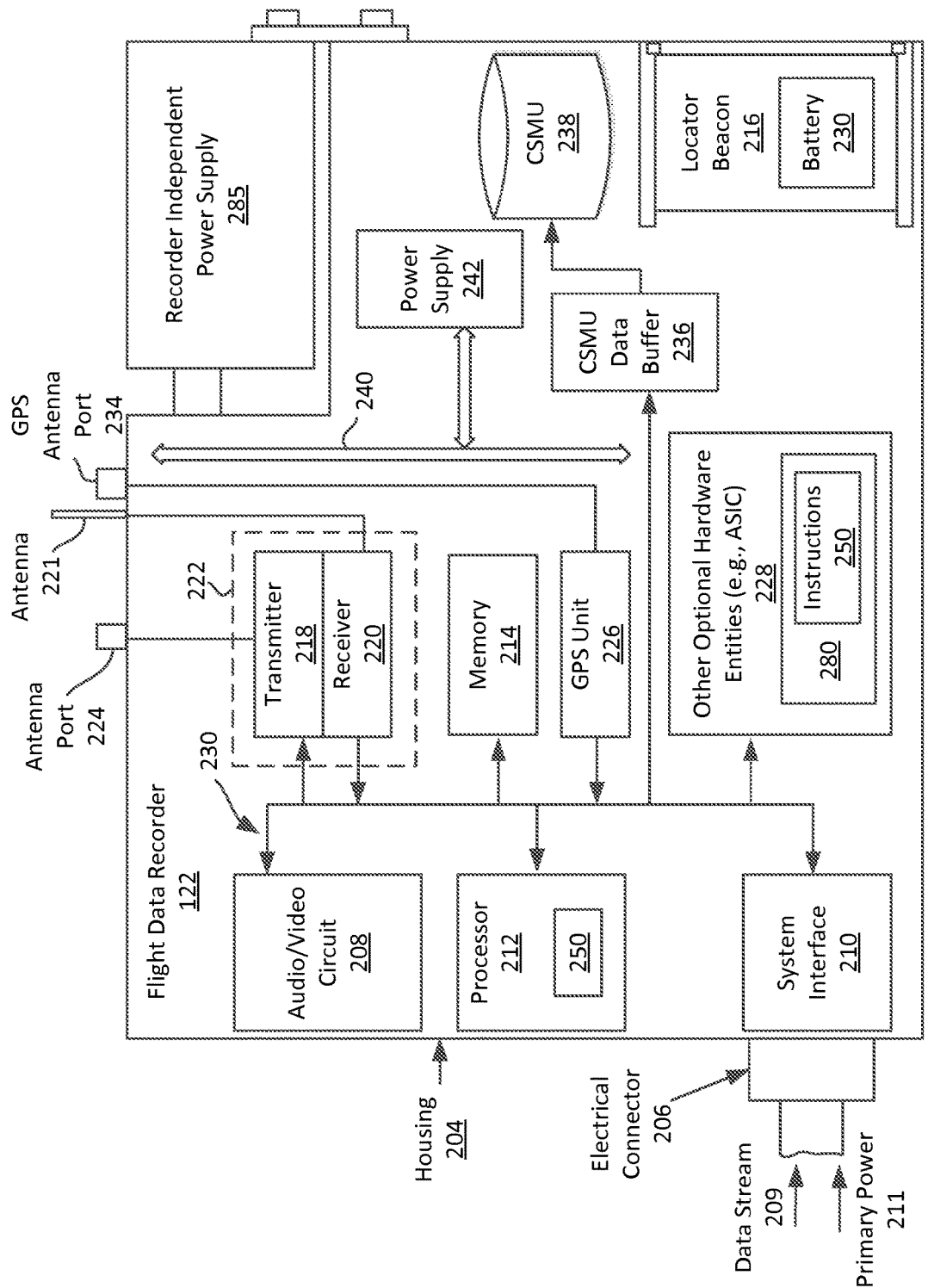
FIG. 2 is a detailed block diagram of an exemplary flight data recorder that is useful for understanding the present invention.

FIG. 2 is a detailed block diagram of a first exemplary embodiment of the FDR 122 that is useful for understanding the present invention. The FDR 122 can include more or less components than those shown in FIG. 2. However, the components shown are sufficient to disclose an illustrative embodiment implementing the present invention. The hardware architecture of FIG. 2 represents one possible embodiment of a representative FDR, but it should be understood that the invention is not limited in this regard.

As shown in FIG. 2, the FDR 122 is comprised of a housing 204 on which an electrical connector 206 is provided. Within the housing there is provided a system interface 210, a processor 212, at least one audio/video circuit 208, a system bus 230, a CSMU data buffer, a memory device 214 connected to and accessible by other portions of the FDR 122 through system bus 230, a GPS unit 226, a locator beacon 216, and hardware entities 228 connected to system bus 230. Hardware entities 228 can include microprocessors, Application Specific Integrated Circuits (ASICs) and other hardware. At least some of the hardware entities 228 perform actions involving access to and use of memory device 214, which can be a Random Access Memory (RAM), a disk driver and/or a Compact Disc Read Only Memory (CD-ROM). System interface 210 allows the FDR 122 to communicate directly or indirectly with external devices. The CSMU data buffer 236 buffers flight data which is to be recorded. The CSMU data buffer communicates buffered flight data to a crash survivable memory unit (CSMU) 238. The FDR 122 could also be provided with a Recorder Independent Power Supply (RIPS) 285 for powering the FDR in the event of a power interruption to the FDR.

The FDR also includes embedded wireless communications equipment 222 and GPS unit 226. The wireless communications equipment includes a transmitter and can also include a receiver 220. According to one aspect, the wireless communication equipment 222 can comprise a transceiver. However, the invention is not limited in this regard and the transmitter 218 and receive 220 can be selected to operate independently for purposes of effecting the necessary wireless communications described herein. The wireless communications equipment 222 and GPS each communicates with processor 212 and/or other hardware entities 228 using system bus 230.

As shown in FIG. 2, the hardware entities 228 can comprise a computer-readable storage medium 280 on which is stored one or more sets of instructions 250 (e.g., software code) configured to implement one or more of the methodologies, procedures, or functions described herein. The instructions 250 can also reside, completely or at least partially, within the memory device 214, the processor 212 during execution thereof by the FDR 122. The components 214, 212, 232 also can constitute machine-readable media. The term "machine-readable media", as used here, refers to a single medium or multiple media (e.g., a centralized or distributed database, and/or associated caches and servers) that store the one or more sets of instructions 250. The term "machine-readable media", as used here, also refers to any medium that is capable of storing, encoding or carrying a set of instructions 250 for execution by the FDR 122 and that cause the FDR 122 to perform any one or more of the methodologies of the present disclosure.

The FDR performs flight data recorder operations in a conventional manner. The flight data recorder operations can involve receiving a data stream 209 from a flight data acquisition unit 102. The data stream 209 includes a plurality of flight data parameters to be recorded. For example, such flight data parameters can include, but are not limited to, air speed, altitude, vertical acceleration, time, magnetic heading, control-column position, rudder-pedal position, control-wheel position, wing flap position, horizontal stabilizer, fuel flow and landing gear position. One or more of these data elements is buffered and stored in CSMU 238 as is known in the art. Similarly, primary electrical power 211 is provided through the electrical connector 206 or through another suitable electrical connector disposed on the FDR housing 204.

The communications equipment 222 can include any suitable type of communications equipment that is capable of carrying out the inventive arrangements described herein. For example, the communication equipment 222 can include a transmitter 218 which is configured for communicating with an earth-orbiting satellite (not shown) using a satellite communication protocol, including short burst communications. Alternatively the communication equipment can conform to known communication protocols defined for ADS-B transmissions. An ADS-B-Out transponder channel could transmit ADS-B type information to ground controllers and other aircraft in the vicinity using communication protocols defined for ADS-B. As a further alternative or addition to the foregoing, the communication equipment can be comprised of cellular radio equipment, WiFi (based on IEEE 802.11 standard) or WiMax (based on IEEE 802.16 standard) type communication equipment. Such communications protocols could be used when the aircraft is near the ground and/or in range of appropriate commercial networks while airborne. The GPS unit can be any suitable device capable of using satellite data to determine a geographic location, and communicating location data to the processor 212, hardware entities 228, and/or memory 214.

In the embodiment shown, the communications equipment 222 and the GPS unit 226 are integrated within the housing 204 of the FDR. However, it is also possible for these components to be attached on an external portion of the housing. The communication equipment and the GPS (as well as other components within the FDR) derive primary electrical power for their operation from one or more internal power busses 240. The internal power bus 240 can be connected to an internal FDR power supply 242. Alternatively, the internal power bus can be connected to an essential aircraft power bus (not shown) through electrical connector 206. Power supply connections are not shown in FIG. 2 so as to avoid obscuring the invention.

The communications equipment 222 and the GPS unit 226 are under the exclusive control of processing elements within the FDR (e.g. processor 212, and/or hardware entities 228. The FDR is advantageously arranged so that the GPS unit 226 and communications equipment 222 cannot be disabled remotely by flight crew unless the entire FDR itself is powered down. Power is provided to the communications equipment 222 and GPS unit whenever the FDR is powered up. This configuration prevents a flight crew or other from tampering with the monitoring and tracking system described herein, since the FDR must be powered by an essential electrical bus of the aircraft in which it is disposed, and the circuit breakers for the FDR are difficult to access by flight crew during flight.

Antenna port 224 is provided for coupling the communications equipment 222 to a suitable antenna external of housing 204. Similarly, the GPS antenna port 234 is provided for coupling the GPS unit to an antenna external of the housing. For example, the communications equipment can be connected to an external antenna 136 as shown in FIG. 1. Similarly, the GPS unit can be connected to an external antenna 138. The connections to these external antenna can be provided by suitable low-loss cable. The exact location and type of each external antenna used will depend on the particular implementation. However, those skilled in the art will appreciate that the foregoing arrangement is a practical implementation of a completely self-contained aircraft tracking, reporting and monitoring system that cannot easily be disabled by flight crew.

In certain scenarios it may be advantageous to allow an authorized person (exclusive of the flight crew) to trigger flight data transmissions from the FDR. Such transmissions can be triggered by wirelessly communicating a coded message to the FDR using receiver 220. The coded message can be sent from a remote location external of the aircraft. In that scenario, an external antenna 136 will provide the best result. However, in some instances it can be desirable for an authorized person on-board the aircraft to trigger the FDR to begin transmitting tracking and monitoring information. An air marshal would be one example of such a person. In such a scenario, an external antenna may not be desirable as it will be substantially shielded from signals originating from inside the conductive metal skin of the aircraft. Accordingly, it can be advantageous to provide a secondary antenna 221 outside the housing 204 but inside the aircraft to receive signals from an authorized person on board the aircraft. The coded message from the authorized person on-board the aircraft can be transmitted using a portable battery powered transmitter that is exclusively under the control of the authorized person (i.e. not the flight crew). Given the proximity of the receiver 220 to the interior of the aircraft, a very low powered transmitter can be used for this purpose.

Exemplary Method Embodiments of the Present Invention

Figure 3:
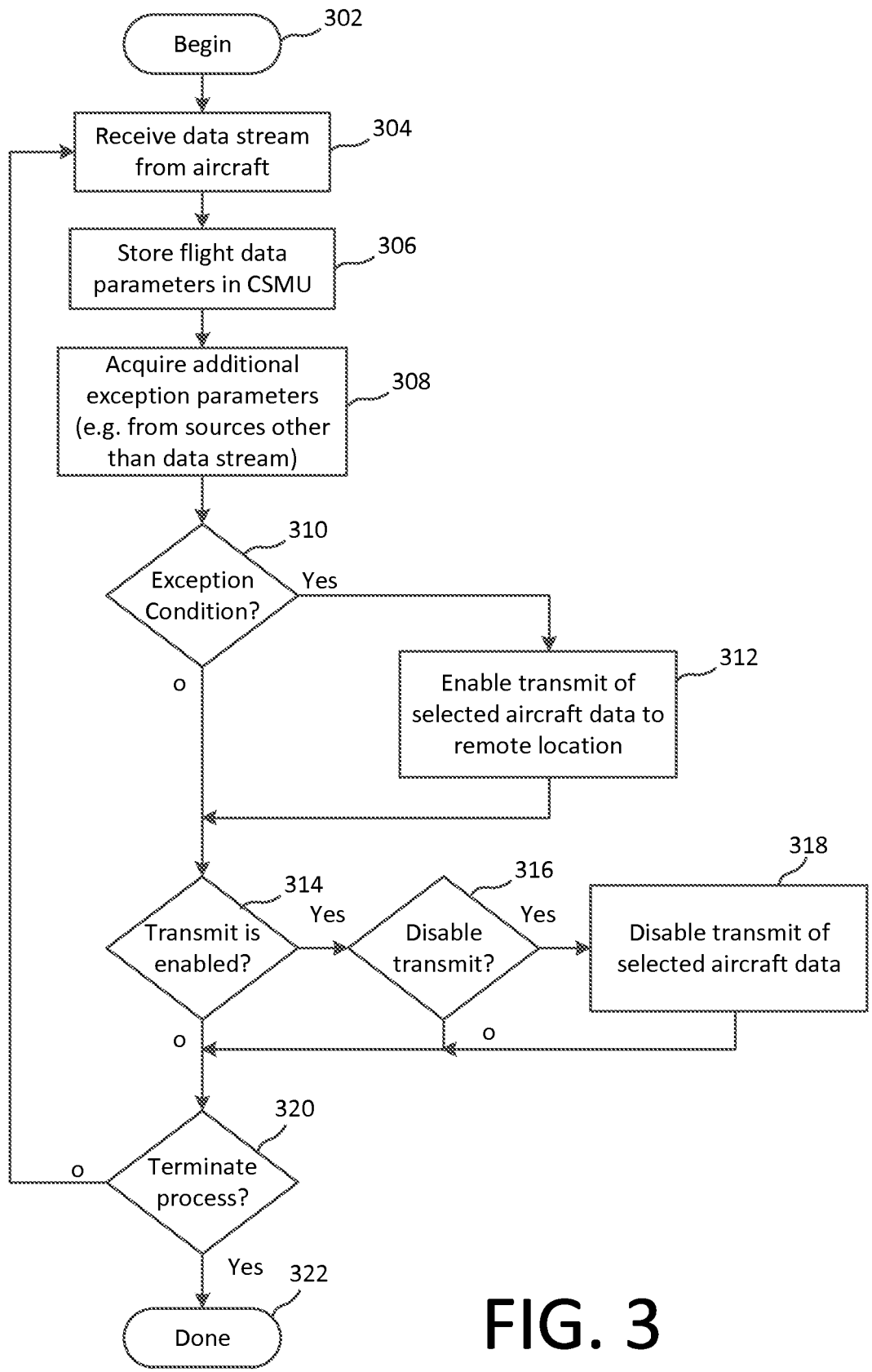
FIG. 3 is a flowchart that is useful for understanding a method for using a flight data recorder for aircraft monitoring and tracking under exceptional conditions

Referring now to FIG. 3, there is provided a flow diagram of an exemplary method of using a flight data recorder to monitor and track aircraft under exceptional conditions. The method begins in step 302 and continues to step 304 in which an FDR received a data stream from a flight data acquisition unit on-board the aircraft. The method continues to step 306 in which the FDR stores one or more of the flight data parameters in a CSMU as is known. At this point, the FDR will have access to at least some of the flight data parameters that are desirable to use for tracking and monitoring purposes as described herein. Also, one or more of the flight data parameters may be useful for determining an occurrence of an exceptional condition. These parameters shall be referred to as exception parameters. One or more additional flight data parameters can be acquired by the FDR for the purposes described herein and these additional parameters can be acquired in step 308. As an example, these additional parameters can include GPS location data and/or coded message data received from a source external of the FDR. One or more of these additional parameters acquired in step 308 can also be designated as exception parameters for use in determining the occurrence of an exception condition.

In step 310, the FDR determines whether an exception condition exists. It does so by evaluating one or more of the exception parameters as described above. If an exception condition exists (310: Yes) then the process continues to 312 at which point the FDR enables wireless transmit of selected aircraft data from the FDR to a remote location, using its embedded transmitter. The selected aircraft data can include a geographic location, speed and heading of the aircraft on which the flight data recorder is disposed. The selected aircraft data can also include information such as altitude, vertical acceleration, time, magnetic heading, control-column position, rudder-pedal position, control-wheel position, wing flap position, horizontal stabilizer, fuel flow and landing gear position. Of course the invention is not limited to the foregoing and any other information normally communicated to the FDR can also be included.

Skipping step 314 for the moment, it can be observed a determination is made at step 320 as to whether the process should be terminated (e.g. when the FDR is shut down). If so (320: Yes), the process terminates at 322; otherwise the process returns to step 304 and repeats.

In some scenarios, it may be desirable to terminate FDR wireless data transmissions after some period of time. Accordingly, a determination can be made at 314 as to whether transmit is enabled. If not, the process simply continues on to 320 as described above. However, if transmit is enabled (314: Yes) then a subsequent determination can be made at 316 as to whether transmit of the selected aircraft data should be disabled. If not (316: No) then the process continues on to 320. However, if transmit is to be disabled at this point (316: Yes) then the transmission of selected aircraft data is disabled in 318, after which the process continues on to step 320 and repeats.

As will be understood from the foregoing description, a triggering event for the transmission of monitoring and tracking data from the aircraft using the inventive arrangements is primarily anticipated in the form of an exception condition being detected. The determination of such an exception condition can be based on an evaluation of one or more of the flight data parameters and/or GPS data accessible to the FDR. Still, there are some instances where it is anticipated that the transmission of flight data information may be initiated by other triggering means. For example, a simple timer can be used to trigger transmission of flight data information on a periodic or aperiodic basis. Alternatively, transmission of flight data parameters can also be initiated by a radio command signal received from a ground station or other external signal source.

Tray Embodiment

Figure 4:
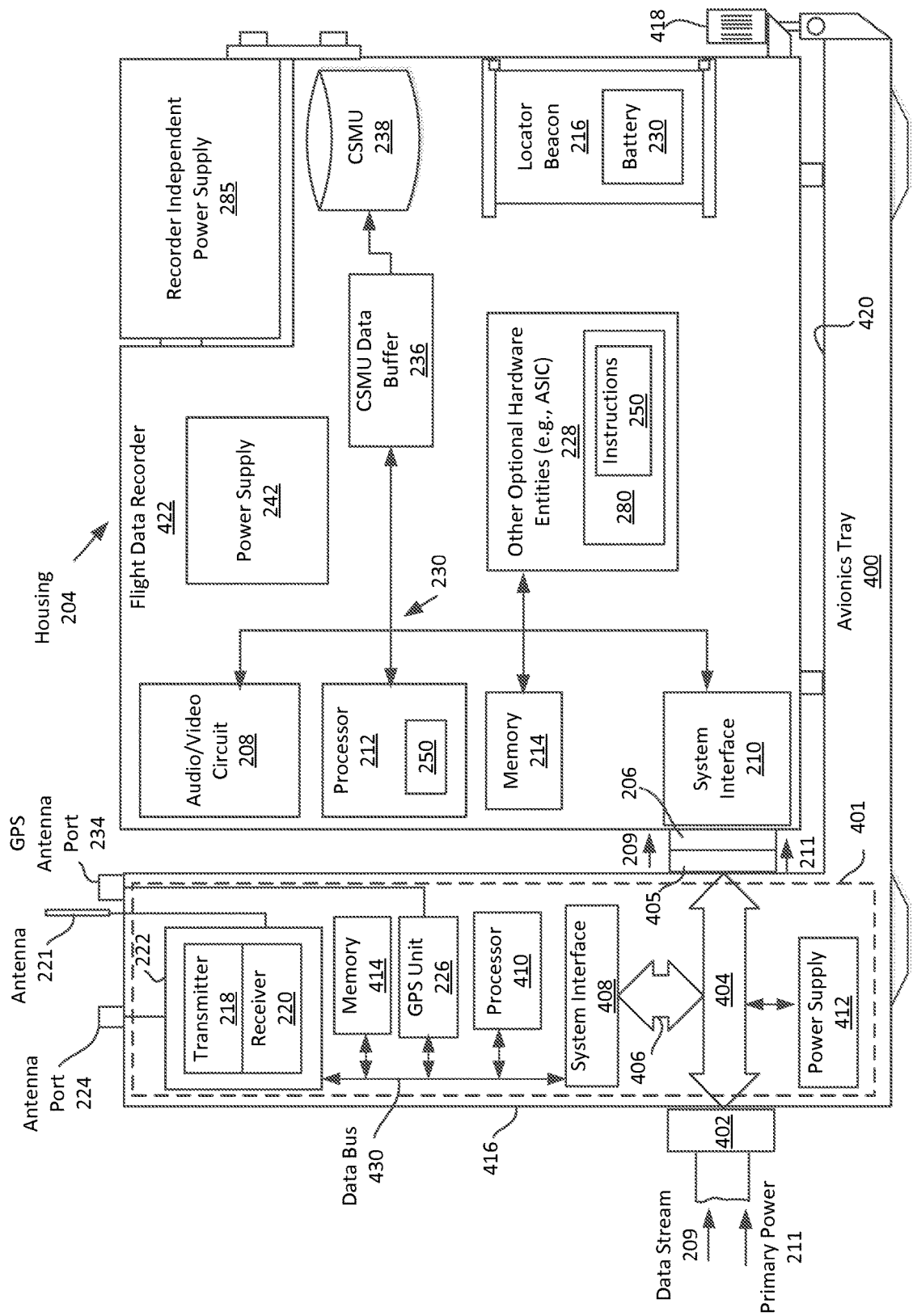
FIG. 4 is a detailed block diagram of an exemplary avionics tray for a flight data recorder, within which an enhanced monitoring and reporting system is provided.

Referring now to FIG. 4, there is shown an alternative embodiment of the inventive arrangements, in which a conventional an FDR 422 is mounted in an avionics tray 400. In the embodiment shown in FIG. 4, certain monitoring and tracking components are incorporated into a chassis or housing defined by the avionics tray 400 to define an enhanced monitoring and reporting (EMR) system 401. The EMR system shown in FIG. 4 can include more or less components than those shown. However, the components shown are sufficient to disclose an illustrative embodiment implementing the present invention. Accordingly, the hardware architecture of FIG. 4 represents one possible embodiment of the inventive arrangements, but it should be understood that the invention is not limited in this regard.

As shown in FIG. 4, a conventional FDR 422 is disposed in an avionics tray 400. For example, the avionic tray 400 shown in FIG. 4 can be configured so that it is compatible with a certain aviation industry electronic tray standard. As such, the avionics tray can have a shelf 420 and one or more hold-down clamps 418 which allow an FDR 422 of predetermined size and configuration to be removably disposed within the avionics tray.

The FDR 422 can be similar in some respects to the FDR 122 described in relation to FIG. 2. Accordingly, like reference numbers are used to identify the common components in FIGS. 2 and 4. The description of the various FDR 122 components in relation to FIG. 2 is sufficient for understanding the operation of the FDR 422 components in FIG. 4. For purposes of brevity, the description of those components will not be repeated here.

In the system shown in FIG. 4, a data stream 209 and primary power 211 are provided from the aircraft to a multi-pin electrical connector 402 disposed on the avionics tray 400. Circuitry 404 in the avionics tray communicates the data stream and primary power to a connector 405 which is also provided on the avionics tray as shown. The connector 405 communicates data stream 209 and primary power 211 to the electrical connector 206 disposed on the FDR housing 204. The FDR 422 performs flight data recorder operations in a conventional manner. The flight data recorder operations can involve receiving a data stream 209 from a flight data acquisition unit 102. The data stream 209 includes a plurality of flight data parameters to be recorded. For example, such flight data parameters can include, but are not limited to, air speed, altitude, vertical acceleration, time, magnetic heading, control-column position, rudder-pedal position, control-wheel position, wing flap position, horizontal stabilizer, fuel flow and landing gear position. One or more of these data elements is buffered and stored in CSMU 238 as is known in the art.

Located within the avionics tray 400 are certain monitoring and tracking components associated with the EMR system 401. These components can be used to perform enhanced aircraft monitoring and reporting processes similar to those described in relation to FIG. 3. In the embodiment shown in FIG. 4, the various monitoring and tracking components are shown in a portion of the avionics tray 400 that is adjacent to the FDR 422. However, it will be appreciated that the invention is not limited in this regard and one or more components comprising the EMR system 401 can optionally be disposed in portions of the avionics tray below the shelf 420, but still within the tray housing 416.

In the inventive arrangements, an EMR system 401 includes buffer circuitry 406 which routes at least a portion of data associated with data stream 209 to a system data interface 408. A computer processor 410 located in the avionics tray communicates with the system data interface over a data bus 430 to receive at least a portion of the data associated with data stream 209. The processor 410 is arranged to facilitate monitoring and tracking functions similar to those described in relation to FIGS. 2 and 3.

The EMR system 401 includes embedded wireless communications equipment 222 and GPS unit 226 disposed within the housing of the avionics tray. The wireless communications equipment includes a transmitter 218 and can also include a receiver 220. According to one aspect, the wireless communication equipment 222 can comprise a transceiver. However, the invention is not limited in this regard and the transmitter 218 and receiver 220 can be selected to operate independently for purposes of affecting the necessary wireless communications described herein. The wireless communications equipment 222 and GPS unit 226 each communicates with processor 410 and/or other hardware entities within the avionics tray 400 using data bus 430.

The memory 414 can comprise a machine-readable storage medium on which is stored one or more sets of instructions (e.g., software code) configured to implement one or more of the methodologies, procedures, or functions described herein. The instructions can also reside, completely or at least partially, within the processor 410 during execution thereof. The term "machine-readable media", as used here, refers to a single medium or multiple media (e.g., a centralized or distributed database, and/or associated caches and servers) that store the one or more sets of instructions. The term "machine-readable media", as used here, also refers to any medium that is capable of storing, encoding or carrying a set of instructions for execution by the processor 410 that cause the system to perform any one or more of the methodologies of the present disclosure.

The communications equipment 222 and GPS unit 226 can have functions and capabilities similar to those described in relation to FIG. 2. In the embodiment shown, EMR system components (such as communications equipment 222 and the GPS unit 226) are integrated within a housing 416 comprising the avionics tray. However, it is also possible for one or more of these components to be attached on an external portion of the housing 416. The EMR system components advantageously obtain electrical power for their operation from one or more internal power busses (not shown). The internal power bus can be connected to an internal EMR system power supply 412. Alternatively, the internal power bus can be connected to an aircraft power bus (not shown) through electrical connector 402 and circuitry 404. Power supply connections are not shown in FIG. 4 so as to avoid obscuring the invention.

The communications equipment 222 and the GPS unit 226 comprising the EMR system 401 are under the exclusive control of processing elements within the avionics tray housing 416 (e.g. processor 410). These components are preferably configured so that they cannot be controlled by the flight crew of an aircraft. Also, the EMR system receives primary power 211 through the same power circuits used to supply power to the FDR 422. Accordingly, the EMR system 402 is arranged so that it cannot be disabled remotely by flight crew unless the FDR is also powered down. Power is provided to EMR system 401 whenever the FDR 422 is powered up. This configuration prevents a flight crew or other from tampering with the monitoring and tracking system described herein, since the FDR must be powered by an essential electrical bus of the aircraft in which it is disposed, and the circuit breakers for the FDR are difficult to access by flight crew during flight.

Antenna port 224 is provided for coupling the communications equipment 222 to a suitable antenna external of housing 204. Similarly, the GPS antenna port 234 is provided for coupling the GPS unit to an antenna external of the housing. For example, the communications equipment can be connected to an external antenna 136 as shown in FIG. 1. Similarly, the GPS unit can be connected to an external antenna 138. The connections to these external antenna can be provided by suitable low-loss cable. The exact location and type of each external antenna used will depend on the particular implementation. However, those skilled in the art will appreciate that the foregoing arrangement is a practical implementation of a completely self-contained aircraft tracking, reporting and monitoring system that cannot easily be disabled by flight crew.

In certain scenarios it may be advantageous to allow an authorized person (exclusive of the flight crew) to trigger flight data transmissions from the EFR system 401. Such transmissions can be triggered by wirelessly communicating a coded message to the EFR using receiver 220. The coded message can be sent from a remote location external of the aircraft. In that scenario, an external antenna 136 will provide the best result. However, in some instances it can be desirable for an authorized person on-board the aircraft to trigger the EFR to begin transmitting tracking and monitoring information. An air marshal would be one example of such a person. In such a scenario, an external antenna may not be desirable as it will be substantially shielded from signals originating from inside the conductive metal skin of the aircraft. Accordingly, it can be advantageous to provide a secondary antenna 221 outside the housing 204 but inside the aircraft to receive signals from an authorized person on board the aircraft. The coded message from the authorized person on-board the aircraft can be transmitted using a portable battery powered transmitter that is exclusively under the control of the authorized person (i.e. not the flight crew). Given the proximity of the receiver 220 to the interior of the aircraft, a very low powered transmitter can be used for this purpose.

Figure 5:
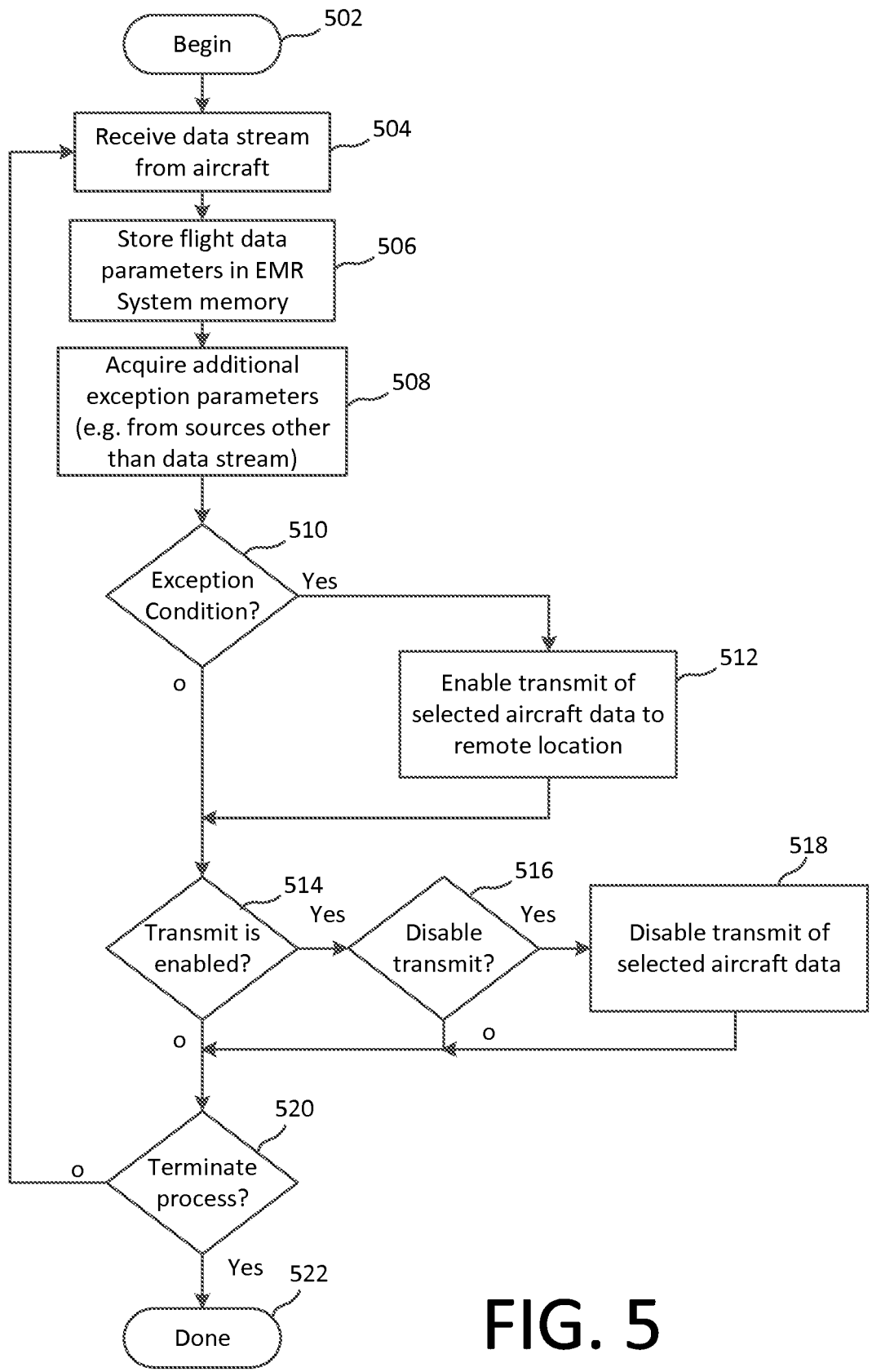
FIG. 5 is a flowchart that is useful for understanding a method for using an avionics tray having an enhanced monitoring and reporting system.

The operation of the EMR system 401 is similar to the process described in FIG. 3, except that the EMR system does not store data in a CSMU. Accordingly, certain monitoring and tracking data from data stream 209 can instead be temporarily stored in memory 414 for use in the event of an exception condition being detected. Referring now to FIG. 5, the method begins in step 502 and continues to step 504 in which an EMR system 401 received a data stream from a flight data acquisition unit on-board the aircraft. The method continues to step 506 in which the EMR stores one or more of the flight data parameters in EMR system memory (e.g. memory 414) as is known. At this point, the EMR will have access to at least some of the flight data parameters that are desirable to use for tracking and monitoring purposes as described herein. Also, one or more of the flight data parameters may be useful for determining an occurrence of an exceptional condition. These parameters shall be referred to as exception parameters. One or more additional flight data parameters can be acquired by the EMR for the purposes described herein and these additional parameters can be acquired in step 508. As an example, these additional parameters can include GPS location data from GPS unit 226 and/or coded message data received from a source external of the EMR. One or more of these additional parameters acquired in step 508 can also be designated as exception parameters for use in determining the occurrence of an exception condition.

In step 510, the EMR determines whether an exception condition exists. It does so by evaluating one or more of the exception parameters as described above. If an exception condition exists (510: Yes) then the process continues to 512 at which point the EMR enables wireless transmit of selected aircraft data from the EMR to a remote location, using its embedded transmitter. The selected aircraft data can include a geographic location, speed and heading of the aircraft on which the flight data recorder is disposed. The selected aircraft data can also include information such as altitude, vertical acceleration, time, magnetic heading, control-column position, rudder-pedal position, control-wheel position, wing flap position, horizontal stabilizer, fuel flow and landing gear position. Of course the invention is not limited to the foregoing and any other information normally communicated to the FDR can also be included. Skipping step 514 for the moment, it can be observed a determination is made at step 520 as to whether the process should be terminated (e.g. when the EMR is shut down). If so (520: Yes), the process terminates at 522; otherwise the process returns to step 504 and repeats.

In some scenarios, it may be desirable to terminate EMR wireless data transmissions after some period of time. Accordingly, a determination can be made at 514 as to whether transmit is enabled. If not, the process simply continues on to 520 as described above. However, if transmit is enabled (514: Yes) then a subsequent determination can be made at 516 as to whether transmit of the selected aircraft data should be disabled. If not (516: No) then the process continues on to 520. However, if transmit is to be disabled at this point (516: Yes) then the transmission of selected aircraft data is disabled in 518, after which the process continues on to step 520 and repeats.

In light of the forgoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A method for monitoring and tracking an at least one exception condition aircraft under exceptional conditions, comprising:

powering a flight data recorder from an essential electrical bus which cannot be shut down under flight conditions without disabling other equipment that is essential for safe flight operations;

receiving at the flight data recorder a data stream from a flight data acquisition unit specifying values for a plurality of flight data parameters while an aircraft is in flight;

storing one or more of the values from the data stream in a memory unit;

determining an occurrence during flight of an exception condition based on an evaluation of at least one exception parameter;

responsive to determining the occurrence of the exception condition, wirelessly communicating selected aircraft data to a remote location external of the aircraft using a wireless transmitter; and preventing actions intended to disable or prevent said wirelessly communicating by (a) exclusively controlling operations of the wireless transmitter with the flight data recorder and (b) only allowing the wireless transmitter to be powered down when the flight data recorder is powered down;

wherein the determining the occurrence during flight of the exception condition comprises receiving, at an antenna of the flight data recorder, a wireless coded message from an authorized person within the aircraft, wherein the wireless coded message is configured to trigger the wirelessly communicating, wherein the antenna is mounted within the aircraft.

2. The method according to claim 1, further comprising preventing interruption of the monitoring and tracking by powering the flight data recorder and the wireless transmitter using an essential electrical bus of the aircraft.

3. The method according to claim 1, wherein the determining the occurrence during flight of the exception condition further comprises determining an occurrence of the exception condition based on the receiving the wireless coded message, and one or more additional exception parameters.

4. A flight data recorder system which facilitates aircraft monitoring and tracking under exceptional conditions, comprising:

a system interface of a flight data recorder, wherein the system interface is configured to receive a data stream from an aircraft specifying a plurality of flight data parameters while the aircraft is in flight;

a crash survivable non-volatile memory unit in which one or more of the plurality of flight data parameters are stored after being received at the system interface;

a wireless transmitter that is under exclusive control of the flight data recorder system, which can be powered down only when the flight data recorder system is powered down, and configured to communicate with a remote receiving device external of the aircraft during flight;

a processing system which determines an occurrence of an exception condition based on an evaluation of at least one exception parameter, and in response to determining the occurrence of the exception condition causes the wireless transmitter to wirelessly communicate selected aircraft data to the remote receiving device; and an antenna mounted within the aircraft and configured to receive a wireless coded message from an authorized person within the aircraft, wherein the processing system is configured to operate responsive to the coded message.

5. The flight data recorder system according to claim 4, wherein at least one exception parameter corresponding to the exception condition includes one or more of the plurality of flight data parameters contained in the data stream which has been received at the flight data recorder.

6. The flight data recorder system according to claim 4, wherein the exception condition comprises receipt of a wireless trigger signal from a remote control point.

7. The flight data recorder system according to claim 4, wherein an exception parameter corresponding to the exception condition specifies one or more of a position, a heading, and a deviation from a pre-determined flight plan for an aircraft in which the flight data recorder is disposed.

8. The flight data recorder system according to claim 4, further comprising a GPS unit under exclusive control of the flight data recorder which provides information concerning a geographic location of the flight data recorder.

9. The flight data recorder system according to claim 8, wherein the flight data recorder includes a power coupling for the GPS unit which serves as a primary source of electrical power to the GPS unit.

10. The flight data recorder system according to claim 8, wherein the selected aircraft data includes a geographic location of the aircraft on which the flight data recorder is disposed.

11. The flight data recorder system according to claim 4, wherein the flight data recorder includes a power coupling for the wireless transmitter that serves as a primary source of electrical power to the wireless transmitter.

12. The flight data recorder system according to claim 4, wherein the processing system determines an occurrence of the exception condition based on an evaluation of two or more exception parameters.

13. The flight data recorder system according to claim 4, wherein the processing system includes in the selected aircraft data one or more flight data parameters provided to the flight data recorder in the data stream.

14. An aircraft with a fail-safe tracking system, comprising a flight data acquisition unit;

a flight data recorder; and an essential electrical bus configured to supply power to the flight data recorder, and which can only be shut down under flight conditions when other equipment that is essential for safe flight operations is also disabled, wherein the flight data recorder includes a system interface which is arranged to receive a data stream from the flight data acquisition unit specifying a plurality of flight data parameters while the aircraft is in flight, a crash survivable non-volatile memory unit in which one or more of the plurality of flight data parameters are stored after being received at the system interface, a wireless transmitter that is under exclusive control of the flight data recorder, which can be powered down only when the flight data recorder is powered down, and configured to communicate with a remote receiving device external of the aircraft during flight, a processing system which determines an occurrence of an exception condition based on an evaluation of at least one exception parameter, and in response to determining the occurrence of the exception condition causes the wireless transmitter to wirelessly communicate selected aircraft data to the remote receiving device, and an antenna mounted within the aircraft and configured to receive a wireless coded message from an authorized person within the aircraft, wherein the processing system is configured to operate responsive to the coded message.

15. An enhanced monitoring and reporting (EMR) system which facilitates aircraft monitoring and tracking under exceptional conditions, comprising:

a system interface which is arranged to receive a data stream from a flight data acquisition unit of an aircraft specifying a plurality of flight data parameters while the aircraft is in flight;

a memory unit in which one or more of the plurality of flight data parameters are stored after being received at the system interface;

a wireless transmitter that is under exclusive control of the EMR system, which can be powered down only when a flight data recorder is powered down, and configured to communicate with a remote receiving device external of the aircraft during flight;

a processing system which determines an occurrence of an exception condition based on an evaluation of at least one exception parameter, and in response to determining the occurrence of the exception condition causes the wireless transmitter to wirelessly communicate selected aircraft data to the remote receiving device; and an antenna mounted within the aircraft and configured to receive a wireless coded message from an authorized person within the aircraft, wherein the processing system is configured to operate responsive to the coded message.

16. The EMR system according to claim 15, wherein at least one of the processing system, the wireless transmitter and the memory unit are disposed internal of a housing which defines an avionics equipment tray.

17. The EMR system according to claim 16, further comprising a flight data recorder removably disposed on a shelf defined by the avionics equipment tray.

18. The EMR system according to claim 17, further comprising a first electrical connector disposed on the avionics equipment tray which receives the data stream from the flight data acquisition unit, and a second electrical connector disposed on the avionics equipment tray which communicates the data stream from the first electrical connector to the flight data recorder, which is removably disposed on the shelf.

19. The EMR system according to claim 18, wherein primary electrical power for the EMR system is coupled from the aircraft to the EMR system through the first electrical connector, and primary electrical power for the flight data recorder is coupled from the first electrical connector to the second electrical connector.

* * * * *